United States Patent
Muratov et al.

(10) Patent No.: US 11,904,234 B2
(45) Date of Patent: Feb. 20, 2024

(54) POSITION TRACKING RING, BAND OR BRACELET AND VIRTUAL REALITY SYSTEM

(71) Applicant: MediaTek Inc., Hsin-Chu (TW)

(72) Inventors: Vladimir A. Muratov, Manchester, NH (US); Da-shan Shiu, Taipei (TW); Yungszu Tu, New Taipei (TW)

(73) Assignee: MediaTek Inc., Hsin-Chu (TW)

( * ) Notice: Subject to any disclaimer, the term of this patent is extended or adjusted under 35 U.S.C. 154(b) by 303 days.

(21) Appl. No.: 15/405,032

(22) Filed: Jan. 12, 2017

(65) Prior Publication Data
US 2017/0239560 A1 Aug. 24, 2017

Related U.S. Application Data

(60) Provisional application No. 62/298,510, filed on Feb. 23, 2016.

(51) Int. Cl.
| | | |
|---|---|---|
| *A63F 13/211* | (2014.01) | |
| *A63F 13/212* | (2014.01) | |
| *A63F 13/235* | (2014.01) | |
| *A63F 13/428* | (2014.01) | |

(52) U.S. Cl.
CPC ......... *A63F 13/211* (2014.09); *A63F 13/212* (2014.09); *A63F 13/235* (2014.09); *A63F 13/428* (2014.09); *A63F 2300/8082* (2013.01)

(58) Field of Classification Search
CPC .... A63F 13/211; A63F 13/212; A63F 13/235; A63F 13/428; A63F 2300/8082; G06F 3/01; G06F 3/011; G06F 3/014; G06F 3/046

USPC .......................................................... 463/37
See application file for complete search history.

(56) References Cited

U.S. PATENT DOCUMENTS

| | | | | |
|---|---|---|---|---|
| 5,446,307 A | * | 8/1995 | Lux ................... | H01L 29/82 257/E27.005 |
| 7,286,880 B2 | * | 10/2007 | Olson ................ | A61N 1/3787 607/61 |
| 2010/0009752 A1 | * | 1/2010 | Rubin ................ | A63F 13/06 463/36 |
| 2011/0234155 A1 | * | 9/2011 | Chen ................. | A61N 1/3787 320/108 |
| 2011/0309153 A1 | * | 12/2011 | Hsu .................. | G06K 19/07783 235/492 |
| 2014/0279528 A1 | * | 9/2014 | Slaby ............... | G06Q 20/40145 705/44 |
| 2015/0258431 A1 | * | 9/2015 | Stafford ............ | A63F 13/213 463/31 |

(Continued)

FOREIGN PATENT DOCUMENTS

| | | | | |
|---|---|---|---|---|
| CN | 103219557 A | | 7/2013 | |
| CN | 204290930 U | | 4/2015 | |
| EP | 1396780 A1 | * | 3/2004 | ............. G06F 3/011 |

*Primary Examiner* — Jay Trent Liddle
(74) *Attorney, Agent, or Firm* — Wolf, Greenfield & Sacks, P.C.

(57) ABSTRACT

A wearable sensor apparatus includes a band shaped and sized to be worn on a finger or limb of a user, a plurality of sensor coils configured to detect a magnetic field. A processor configured to calculate a position of the wearable sensor apparatus based upon signals from the plurality of sensor coils, and a communication module configured to transmit the position of the wearable sensor apparatus.

22 Claims, 9 Drawing Sheets

(56) References Cited

U.S. PATENT DOCUMENTS

| | | | |
|---|---|---|---|
| 2016/0018872 A1* | 1/2016 | Tu | G06F 1/3234 345/173 |
| 2016/0054404 A1* | 2/2016 | Duensing | G01R 33/341 324/309 |
| 2016/0150362 A1* | 5/2016 | Shaprio | H04W 4/02 340/539.13 |

* cited by examiner

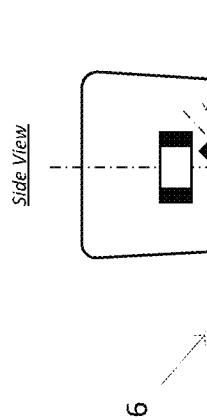
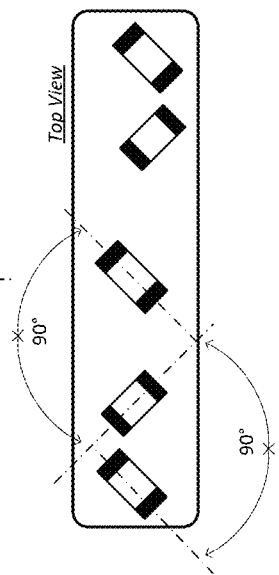

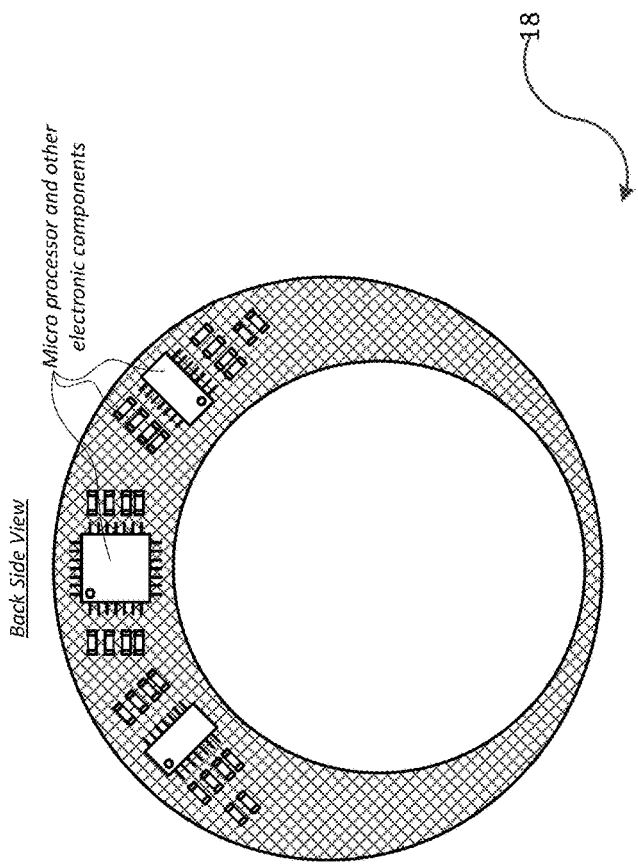
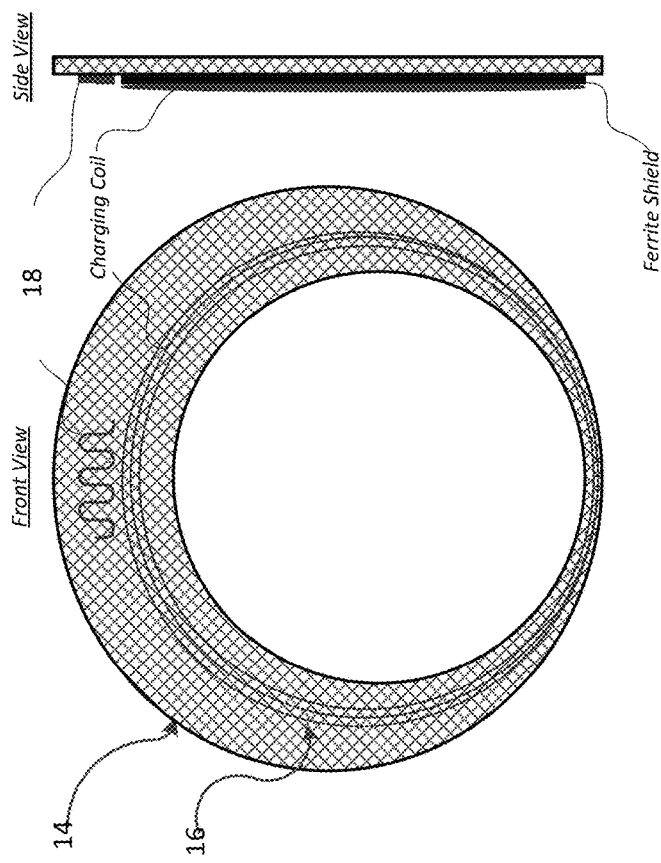
FIG. 9A  FIG. 9B  FIG. 9C

POSITION TRACKING RING, BAND OR BRACELET AND VIRTUAL REALITY SYSTEM

CROSS REFERENCE TO RELATED APPLICATION

This application claims the benefit of U.S. Provisional Application No. 62/298,510, filed Feb. 23, 2016, which is hereby incorporated by reference in its entirety.

BACKGROUND

1. Technical Field

The techniques described herein relate to position tracking devices, and in particular to a wearable position tracking sensor apparatus that can be worn on a user's limb or finger to sense position and/or orientation thereof.

2. Discussion of the Related Art

Virtual Reality (VR) systems are gaining increasing popularity in numerous applications such as video gaming, architectural design, and virtual training. Current VR applications, both mobile phone based and non mobile phone based VR applications, typically use a display such as a computer monitor or virtual reality headset and/or speakers to immerse the user in a virtual environment using visual or audiovisual effects. To allow the user to interact with the virtual environment, a sensor may sense information, such as the position of the user's body, and provide that information to the VR system to update the virtual environment based on movement by the user. Examples of sensors that have been used in VR systems include motion tracking cameras and hand-held motion tracking remotes.

SUMMARY

Some embodiments relate to a wearable sensor apparatus includes a band shaped and sized to be worn on a finger or limb of a user, a plurality of sensor coils configured to detect a magnetic field, a processor configured to calculate a position of the wearable sensor apparatus based upon signals from the plurality of sensor coils, and a communication module configured to transmit the position of the wearable sensor apparatus.

Some embodiments relate to a virtual reality system, including a base station coupled to one or more coils to generate a magnetic field a wearable sensor apparatus. The wearable sensor apparatus includes a band shaped and sized to be worn on a finger or limb of a user, a plurality of sensor coils configured to detect a magnetic field, a processor configured to calculate a position of the wearable sensor apparatus based upon signals from the plurality of sensor coils, and a communication module configured to transmit the position of the wearable sensor apparatus.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIGS. 7A and 7B show an example of a layout of the sensor coils to increase the coil length-to-diameter ratio in the same volume.

FIGS. 9A, 9B and 9C show an exemplary arrangement of the electronics module 15.

DETAILED DESCRIPTION

The inventors have recognized and appreciated that conventional motion tracking sensors for VR applications such as motion tracking cameras or hand-held motion tracking devices may not effectively track the motion of individual limbs or fingers, for example. A sensor that can be worn on the user's limb or finger can provide finer detection and control in the virtual environment. For example, the motion of individual fingers or limbs may be tracked, allowing interaction with the virtual environment by making hand gestures or otherwise moving an appendage. For example, providing the capability of detecting finger motion may allow a user to interact with an environment by performing actions often performed by a hand in real life, such as pushing a button, opening a door, picking up an object, etc., which may be desirable in gaming applications, for example. Another example is training applications. A physician or technician can be trained to perform fine motions such as may be performed in a procedure (e.g., surgery), or repair of a machine.

One challenge with wearable VR sensors is making them small and unobtrusive. Described herein are wearable VR sensor apparatus (also referred to herein as simply "VR sensor apparatus" that addresses this need. In some embodiments, the VR sensor apparatus is sized and shaped to allow it to be worn as a ring on one of the user's fingers. In other embodiments, the VR sensor apparatus is sized and shaped to allow it to be worn as a band or bracelet on one of the user's limbs. The VR sensor apparatus is designed to include the components that measure and/or calculate position and/or orientation and communicate this information to another component of the VR system for use in generating the virtual environment. The VR sensor apparatus may include a battery to power the VR sensor apparatus, thereby avoiding wires that may interfere with a user's movement.

In some embodiments, the VR system emits a magnetic field, and the VR sensor apparatus detects its position in three dimensions and/or its orientation by measuring the magnetic field. The VR sensor apparatus may have at least three sensor coils to sense components of the magnetic field in three dimensions. The VR sensor apparatus may then calculate its position and/or orientation based on the measured field, and communicate this information to the VR system. Prior to describing embodiments of the VR sensor apparatus, an exemplary VR system will be described.

Figure 1:
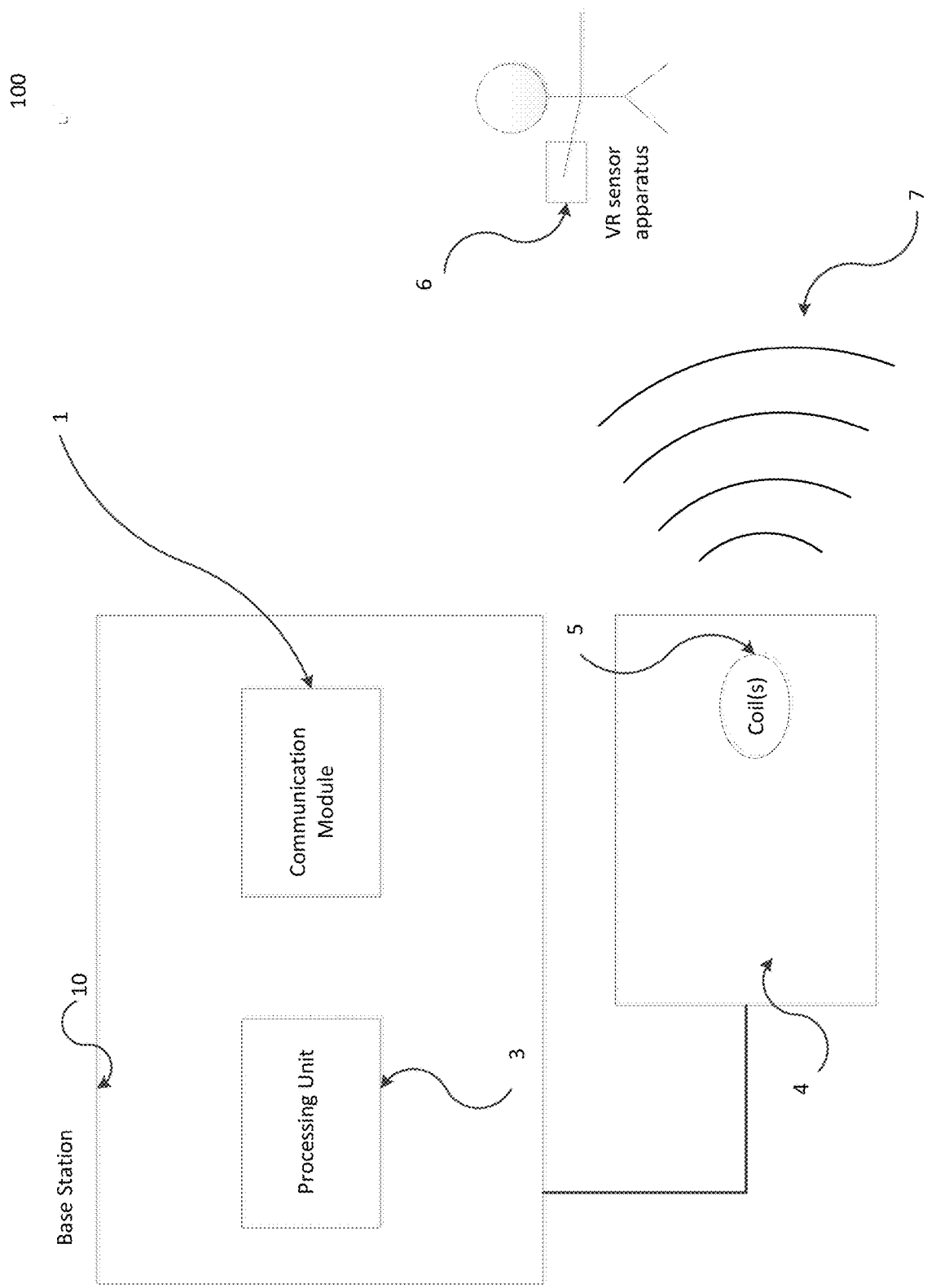
FIG. 1 shows a VR system having a VR sensor apparatus and a base station.

FIG. 1 shows an embodiment of a VR system 100. The VR system 100 may comprise a base station 10, a coil hub 4 and a VR sensor apparatus 6. The base station 10 may comprise a communication module 1 to communicate with VR sensor apparatus 6 using any suitable wired or wireless communication protocol. The base station 10 may include a processing unit 3 which may include one or more processors for generating the virtual environment. The base station 10 may send information regarding the virtual environment to one or more devices that generate a human-perceptible output, such as display (e.g., a monitor, television or headset), speakers (e.g., within our outside of a headset), a vibration or movement actuator, etc., to provide the virtual environment to the user. Since such devices may take many different forms, they are not illustrated in FIG. 1 to facilitate illustrating other aspects of VR system 100.

The base station 10 may be in communication with at least one coil 5. The at least one coil 5 is driven with an electrical signal to generate a magnetic field 7 in three dimensions. In some embodiments, the at least one coil 5 includes three or more coils to generate the magnetic field 7 in three dimensions. The magnetic field 7 generated by the at least one coil 5 is sensed by the VR sensor apparatus 6 to detect its position and/or orientation. There are a number of ways in which the at least one coil 5 may generate a suitable magnetic field 7. As one example, three coils may be oriented to generate fields in the X direction, the Y direction, and the Z direction, respectively. The three coils may be time-multiplexed, such that only one of the three coils is energized at a time. As an example, the X coil may be energized for a period of time, then the Y coil may be energized for a period of time, then the Z coil may be energized for a period of time. The VR sensor apparatus 6 may communicate with the communication module 1 to synchronize the timing of magnetic field generation and detection, so that the VR sensor apparatus 6 knows which coil is energized in each time period. The VR sensor apparatus may include coils oriented in three different directions to detect the fields. Analyzing the strength of the field detected by each coil in each detection period allows localizing the VR sensor apparatus 6 in three dimensions. As another example, each of the three coils 5 may be energized at the same time, but at different frequencies. The VR sensor apparatus 6 may analyze the strength of the signal received by the respective coils at each frequency to determine the orientation of the VR sensor apparatus 6.

The at least one coil 5 may be positioned within a coil hub 4 that is in communication with the base station 10. Positioning the at least one coil 5 in a separate coil hub may allow flexibility in positioning the at least one coil 5. In some embodiments, the at least one coil 5 may be positioned within the base station 10.

As mentioned above, VR sensor apparatus 6 may measure the magnetic field 7 and process this information to calculate its position and/or orientation within the magnetic field 7. The sensed position and/or orientation data may then be transmitted by VR sensor apparatus 6 to the communication module 1 of the base station 10 so that the VR system 100 may utilize the information regarding the position and/or orientation of the VR sensor apparatus 6 to produce the virtual environment for the user.

Figure 2:
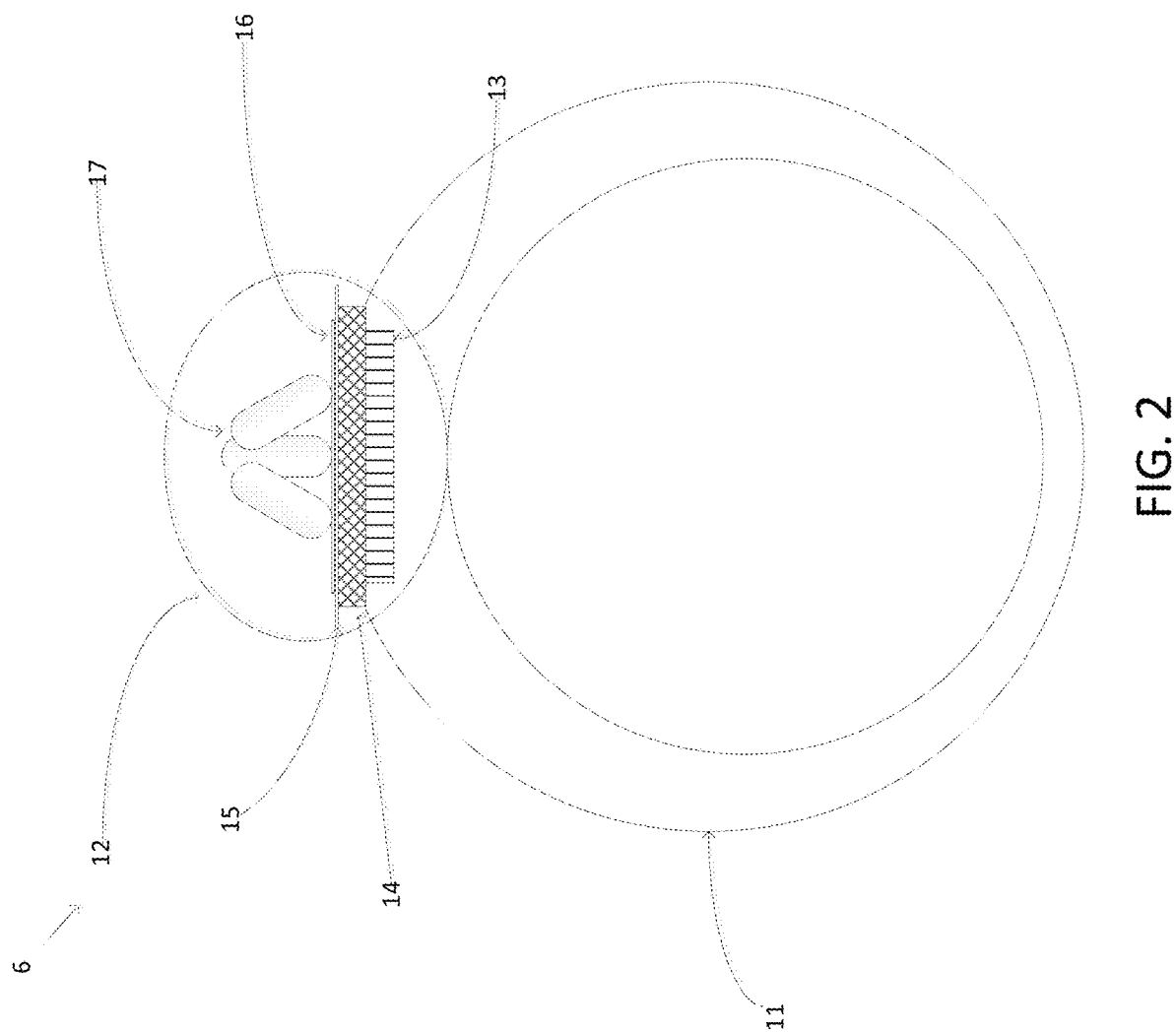
FIG. 2 shows one embodiment of a VR sensor apparatus, with the coils in a pyramidal structure inside of an imitation stone.

FIG. 2 shows an embodiment of a VR sensor apparatus 6 that may be sized and shaped as a ring to be worn on a user's finger or as a bracelet, band or wristwatch to be worn on the user's wrist or limb. The VR sensor apparatus 6 includes a band 11 and an imitation stone 12. In this embodiment, the imitation stone 12 houses electronic components of the VR sensor apparatus 6. Imitation stone 12 houses a battery 13, an electronics module 14, a magnetic shield 15, a charging coil 16 and three sensor coils 17 to sense the magnetic field produced by the at least one coil 5 of the VR system 100. The techniques described herein are not limited as to the components within the stone, as one or more components may be positioned outside the stone or omitted entirely. The locations of the components within the stone is for illustrative purposes only, and is not meant to be limiting.

According to this embodiment, the sensor coils 17 are arranged in a triangular pyramidal configuration, positioned at an angle of 120° with respect to each other (as viewed from above). In other embodiments, the coils may be positioned in a mutually orthogonal way, or any way that permits a three dimensional spatial sensor measurement to be made. The sensor coils 17 are electrically connected to the electronics module 14, which may include suitable circuitry for amplifying and/or digitizing the signals from the sensor coils 17 and processing the measurements.

The band 11 of any embodiment described herein may be sized to be worn as a ring on a user's finger or as a band, bracelet or wristwatch on the user's arm, wrist or limb, for example. The band 11 may be formed of any suitable material, such as metal or plastic, for example. The imitation stone 12 may be formed of a nonconductive and nonferrous material, such as plastic, for example. Imitation stone 12 may take any appearance, and in some embodiments may resemble a gemstone.

Charging coil 16 may be configured to receive power wirelessly using any suitable wireless power transmission technique, examples of which include magnetic induction and magnetic resonance. Wirelessly transferring power to charging coil 16 allows re-charging the battery 13. Battery 13 may be any suitable type of battery, one example of which is a lithium-ion battery.

Magnetic shield 15 may include a ferrous material, such as ferrite, for example. The magnetic shield 15 may provide a return flux path for the magnetic charging field transmitted to charging coil 16, and may shield the battery 13 from the magnetic charging field. The charging coil 16 and the sensor coils 17 may be conductive, and may be any suitable conductors such as wires or traces, and may have any suitable number of turns.

Figure 3:
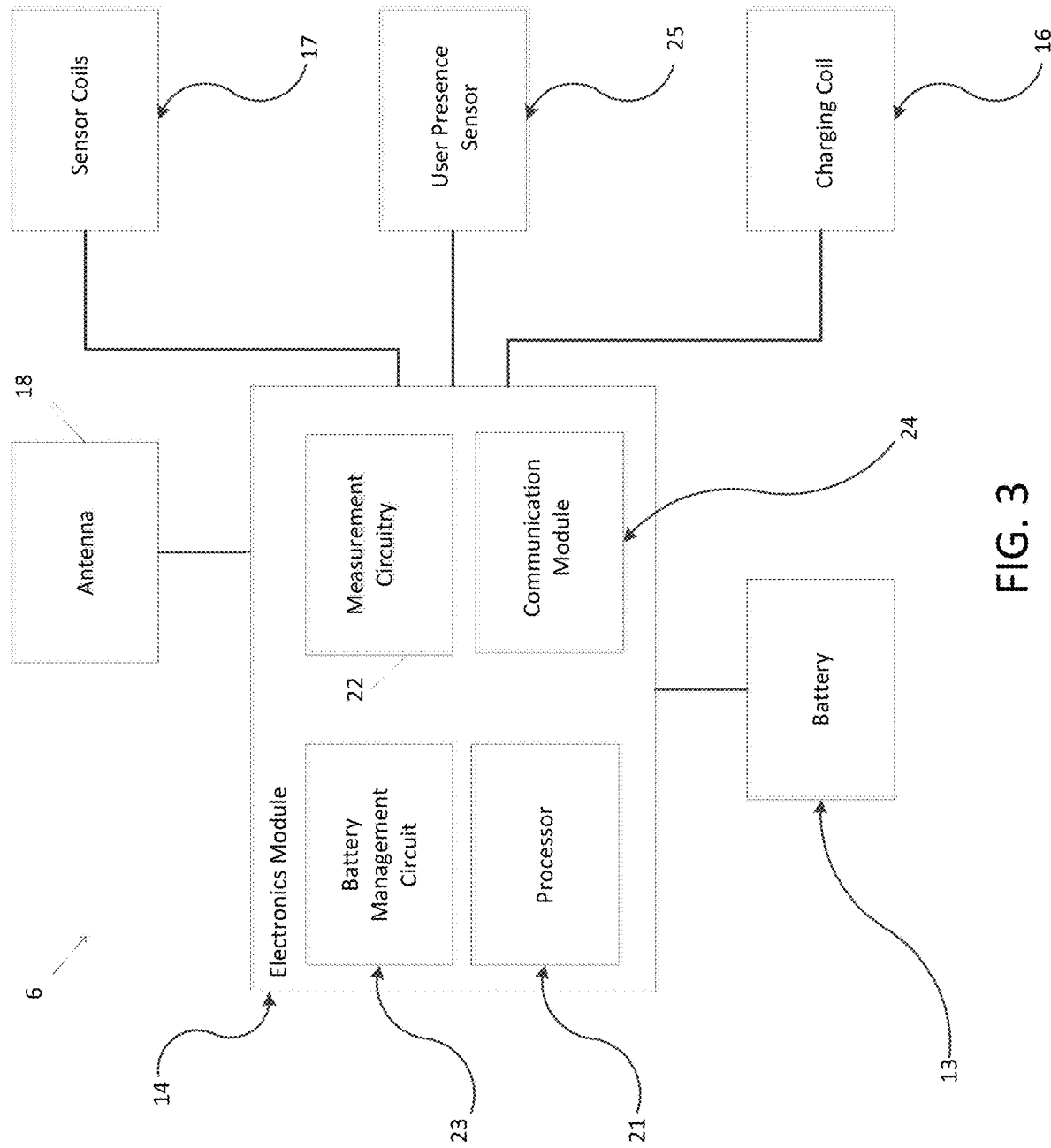
FIG. 3 shows an electrical block diagram of a VR sensor apparatus.

FIG. 3 shows an electrical block diagram of the VR sensor apparatus 6. The electronics module 14 may comprise a processor 21, a communication module 24, a battery management circuit 23 and measurement circuitry 22. The electronics module 14 may have electrical connections to the battery 13, the charging coil 16, the user presence sensor 25, discussed further below, the sensor coils 17 and an antenna 18. The electronics module may be formed on a PC board or other substrate, or may be formed on a chip, as the techniques described herein are not limited in this respect. Measurement circuitry 22 measures signals from the sensor coils 17 and may digitize them. The measurement circuitry 22 may provide the measured values to the processor 21 for analysis, to calculate position and/or orientation of the VR sensor apparatus 6 based upon magnetic field 7. The processor 21 provides calculated position and/or orientation information to the communication module 24, which transmits it to the communication module 1 of the base station 10 via wired or wireless communication through the antenna 18. Examples of suitable wireless communication technologies include BLUETOOTH, ZIGBEE, and WIFI, merely by way of example. However, the communication is not limited to such technologies. As used herein, the phrase "transmit the position" and the like refers to sending any signals with information regarding the position. Such signals may be any type of signals, such as analog or digital signals. Battery management circuit 23 charges and maintains the battery 13. The battery management circuit 23 may include a rectifier to rectify the charging signal received by the charge coil 16. It may also include a voltage regulator or DC/DC converter to regulate the rectified voltage to charge the battery 13.

Figure 4:
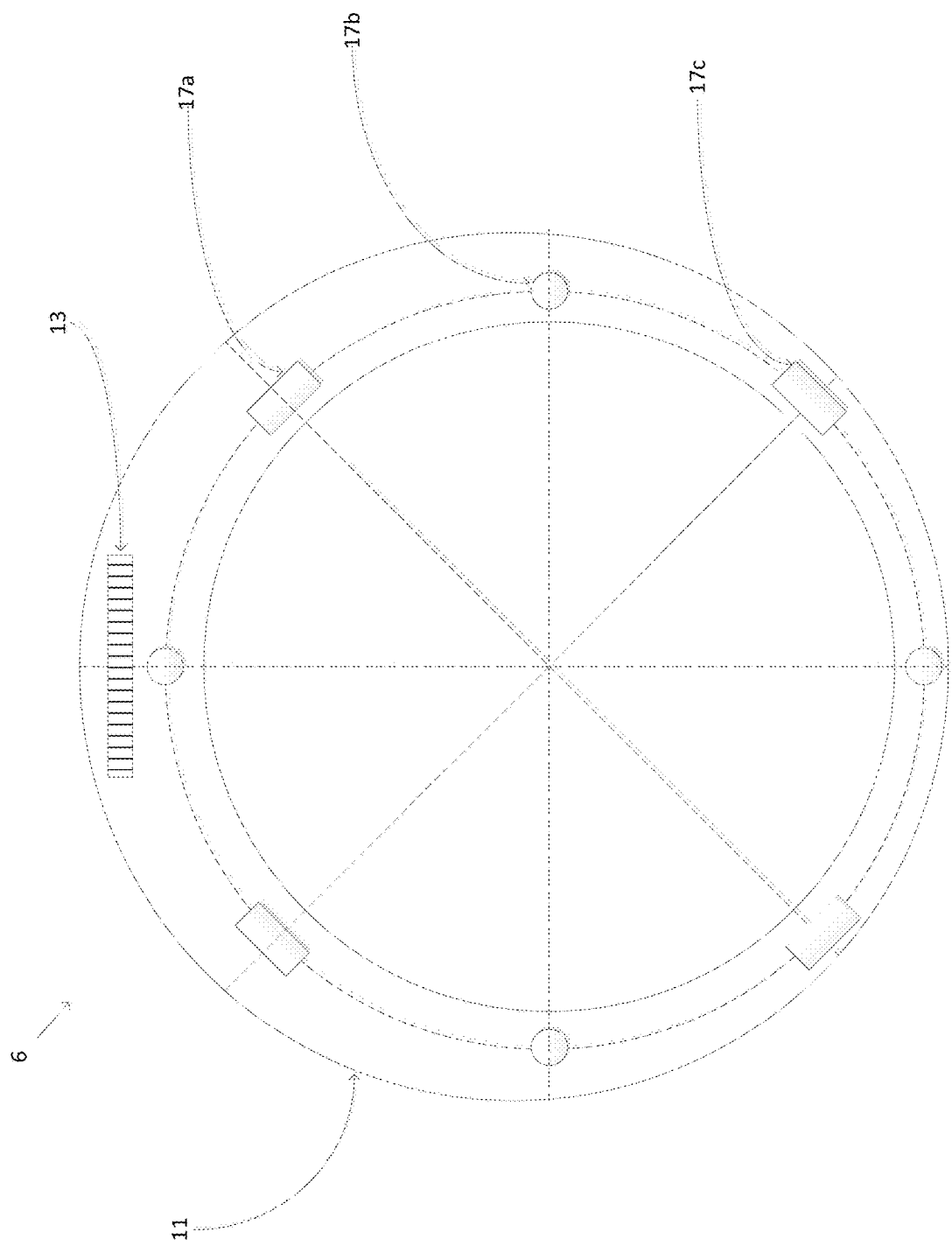
FIG. 4 shows a VR sensor apparatus without a stone.

FIG. 4 shows another embodiment of a VR sensor apparatus 6 in which the sensor coils 17 are arranged around the band 11. To be orthogonal in three dimensions, for example, the coil 17a lies within the plane of the page, the coil 17b is directed out of the page and coil 17c lies within the plane of the page but normal to coil 17a. This embodiment removes the need for the imitation stone, as the battery 13 may be positioned in the head of the band 11 or in another portion of the band. Electronics module 14 and/or other electrical components may be positioned on one or more printed circuit boards (PCBs) within the head of the band or another portion of the band.

In some VR applications, it may be desirable to determine the orientation of the VR sensor apparatus 6, either alternatively or additionally to the position. To do so, the VR sensor apparatus 6 may be configured such that its orientation can be distinguished by the electronics module 14.

Figure 5:
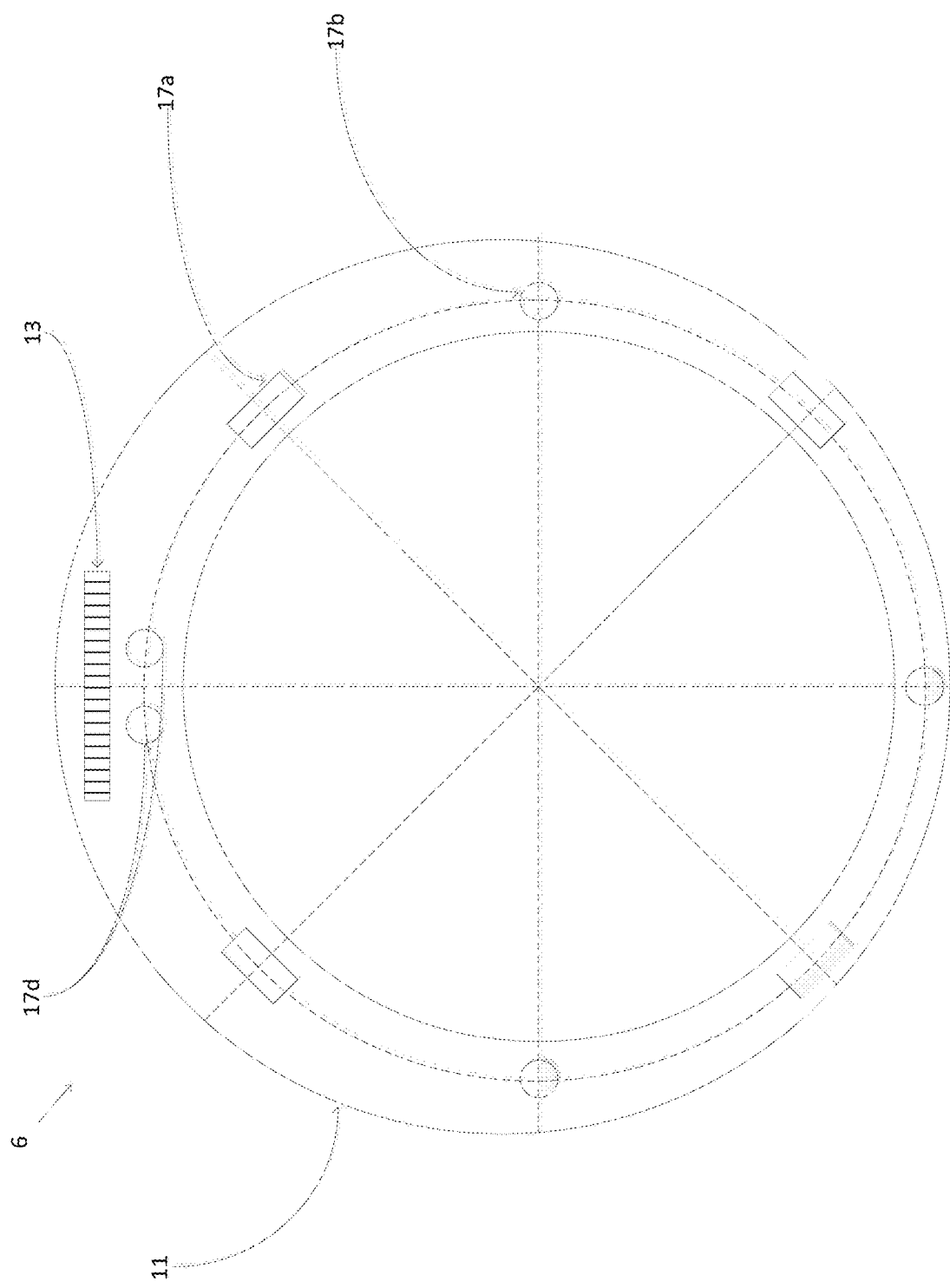
FIG. 5 shows another embodiment of the VR sensor apparatus, with a dual coil to identify the top of the VR sensor apparatus.

FIG. 5 shows one embodiment, a modification of FIG. 4, where the head of the band 11 may have duplicated sensor coils 17d. Signals received from the co-placed coils are essentially identical, which allows the electronics module 14 to identify the top of the VR sensor apparatus 6 space. The choice of the head of the band 11 to have the duplicated coils is not a limitation of the present invention. Other embodiments may have the duplicated coils in any other position around the band 11.

Figure 6:
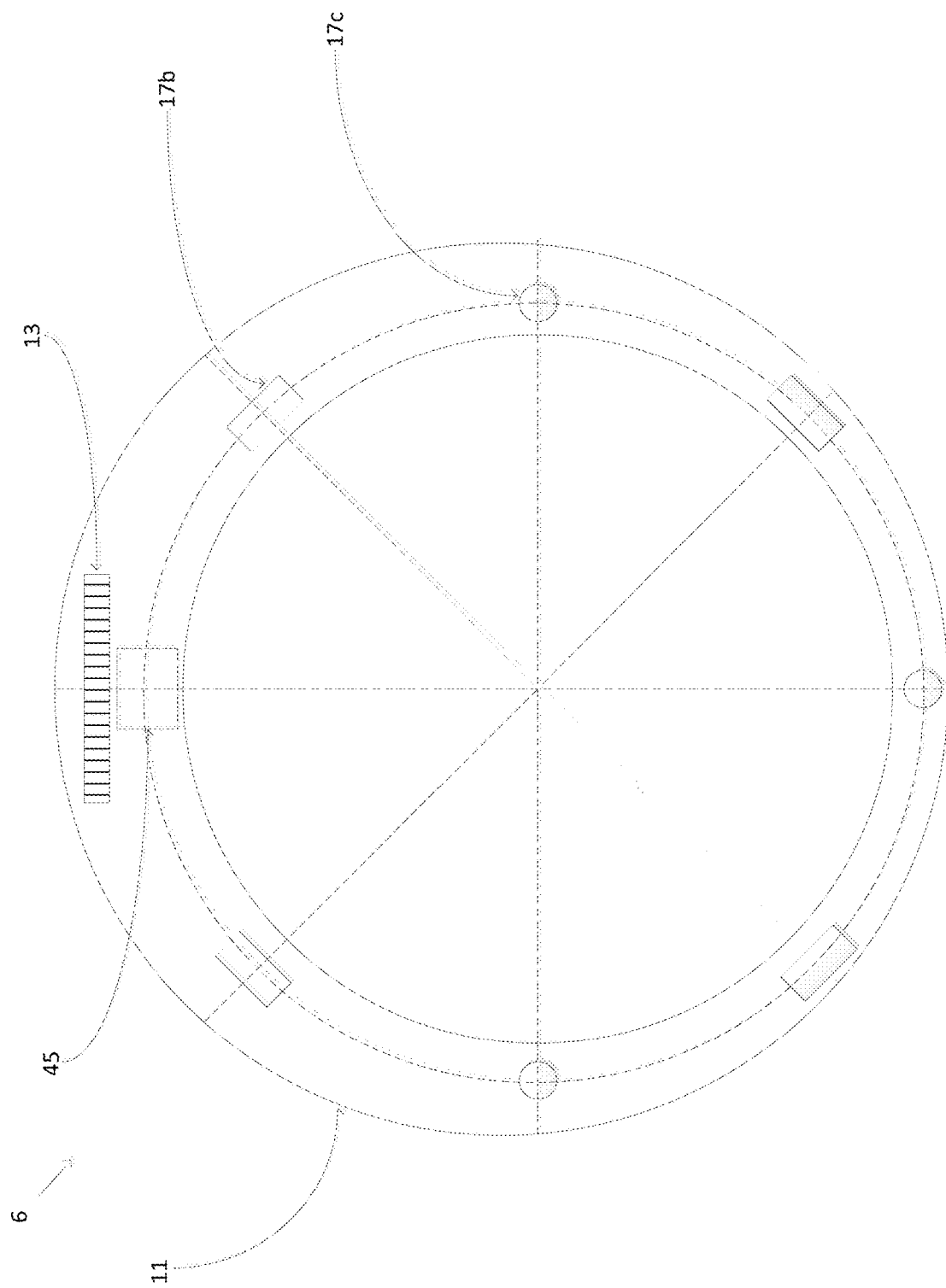
FIG. 6 shows another embodiment of the VR sensor apparatus, with an absence of a coil to identify the top of the VR sensor apparatus.

FIG. 6 shows another embodiment of the apparatus with orientation detection capability. In this embodiment, the known position on the ring may have the absence of a coil 45. The electronics module 14 is capable of identifying the void between some sensor coils 17 being larger than others by analyzing the data from the sensor coils 17, and thus designating the void 45 as a head or other location on the band 11. The choice of the head to have the coil void 45 is not a limitation of the present invention. Other embodiments may have the coil void 45 in another position around the band 11.

FIG. 7A shows a side view of a band 11 with an alternative embodiment of the coil placement. The coils may be placed in an alternating diagonal fashion, so as to be approximately normal (e.g., between 85° and 95° to adjacent coils. The illustration of only three coils and their relative spacing and orientation is not a limitation of the present invention, as more coils could be arranged in this fashion or a similar fashion within the scope of this embodiment. FIG. 7B shows a side view corresponding to FIG. 7A. The diagonal placement serves to increase the coil length-to-diameter ratio in the same volume. The rest of the components within the band are not shown to simplify the illustration.

Figure 8:
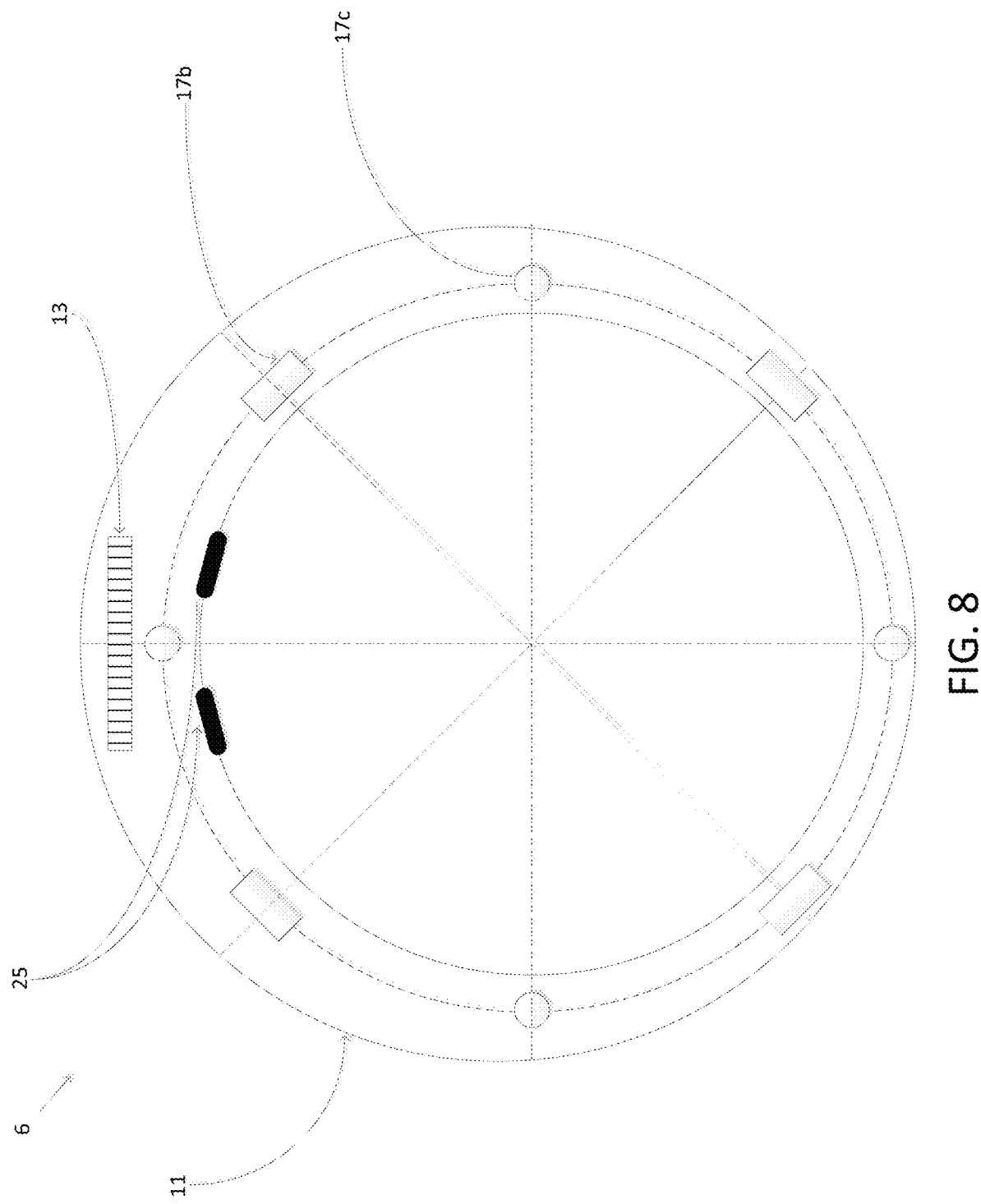
FIG. 8 shows an embodiment as in FIG. 2 with the addition of user presence sensor pads.

FIG. 8 shows a modification of FIG. 4 with the addition of user presence sensor 25. User presence sensor 25 may take the form of capacitive sensing pads, which may be electrically coupled to capacitive sensing electronics of electronics module 14. When VR sensor apparatus 6 is put on (e.g., on the user's finger or wrist), the sensor pads 25 may detect the presence of the user through a contactless sensing system such as capacitive sensing, and activate the VR sensor apparatus 6. In some embodiments, the processor 21 may put the VR sensor apparatus 6 into a low-power standby mode after not detecting the user's presence for a period of time. Using a user presence sensor 25 to enable the VR sensor apparatus 6 may reduce power consumption and improve battery life. The existence of two pads in the illustration is not a limitation of the present invention, as more or fewer pads could be implemented. Similarly, the addition user presence sensor 25 the embodiment of FIG. 4 is not a limitation of the present invention, as the user presence sensor 25 may be implemented on any of the other embodiments describes herein.

FIGS. 9A-9C shows an exemplary arrangement of the electronics module 14. As shown in FIG. 9A one side of the electronics module 14 may include the charging coil 16 and an antenna 18. FIG. 9B shows a side view illustrating the magnetic shield may reside between the charging coil 16 and the electronics module 14. In this embodiment the processor 21 and/or other circuitry may reside on the opposite side of the electronics module 14, as shown in FIG. 9C, to make the spatial arrangement more compact. The particular layout of the electronics module 14 and associated components is not a limitation of the present invention.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A wearable sensor apparatus, comprising:
   a band shaped and sized to be worn on a finger or limb of a user;
   a plurality of sensor coils configured to detect a magnetic field;
   a processor configured to calculate a position of the wearable sensor apparatus based upon signals from the plurality of sensor coils; and
   a communication module configured to transmit the position of the wearable sensor apparatus,
   wherein the plurality of sensor coils are arranged in a triangular pyramidal shape.

2. The wearable sensor apparatus of claim 1, further comprising a wireless charging coil.

3. The wearable sensor apparatus of claim 2, wherein the wireless charging coil is wound around an interior of the band.

4. The virtual reality system of claim 1, wherein the plurality of sensor coils are disposed within the band.

5. The wearable sensor apparatus of claim 4, configured to detect an orientation of the wearable sensor apparatus.

6. The wearable sensor apparatus of claim 5, wherein a sensor coil is duplicated to denote the orientation of the wearable sensor apparatus.

7. The wearable sensor apparatus of claim 5, wherein a sensor coil is absent to denote the orientation of the wearable sensor apparatus.

8. The wearable sensor apparatus of claim 4, wherein the plurality of sensor coils are disposed at multiple respective locations within the band.

9. The wearable sensor apparatus of claim 4, wherein the processor is disposed within a head of the band or in another portion of the band.

10. A wearable sensor apparatus, comprising:
- a band shaped and sized to be worn on a finger or limb of a user;
- a plurality of sensor coils configured to detect a magnetic field;
- a processor configured to calculate a position of the wearable sensor apparatus based upon signals from the plurality of sensor coils;
- a user presence sensor configured to activate the wearable sensor apparatus when the wearable sensor apparatus is worn by a person; and
- a communication module configured to transmit the position of the wearable sensor apparatus,
- wherein the plurality of sensor coils are arranged in a triangular pyramidal shape.

11. The wearable sensor apparatus of claim 10, wherein the user presence sensor comprises a capacitive sensor having one or more pads on an interior of the band.

12. The wearable sensor apparatus of claim 10, wherein the user presence sensor is configured to activate the wearable sensor apparatus responsive to determining that the person is wearing the wearable sensor apparatus.

13. A virtual reality system, comprising:
- a base station coupled to one or more coils to generate a magnetic field; and
- a wearable sensor apparatus, including:
  - a band shaped and sized to be worn on a finger or limb of a user;
  - a plurality of sensor coils configured to detect the magnetic field generated by the base station;
  - a processor configured to calculate a position of the wearable sensor apparatus based upon signals from the plurality of sensor coils;
  - a wireless charging coil wound around an interior of the band; and
  - a communication module configured to transmit the position the wearable sensor apparatus to the base station,
  - wherein the plurality of sensor coils are arranged in a triangular pyramidal shape.

14. The virtual reality system of claim 13, wherein the wearable sensor apparatus further comprises a battery.

15. The virtual reality system of claim 13, wherein the plurality of sensor coils are disposed within the band.

16. The virtual reality system of claim 13, wherein the wearable sensor apparatus further comprises an imitation stone comprising the plurality of sensor coils.

17. The virtual reality system of claim 13, wherein the wearable sensor apparatus further comprises a magnetic shield and a battery, wherein the magnetic shield is positioned between the wireless charging coil and the battery.

18. The virtual reality system of claim 13, wherein the wearable sensor apparatus further comprises a user presence sensor configured to activate the wearable sensor apparatus when a user is detected.

19. The virtual reality system of claim 18, wherein the user presence sensor comprises a capacitive sensor having one or more pads on an interior of the band.

20. The virtual reality system of claim 13, wherein the wearable sensor apparatus is configured to detect an orientation of the wearable sensor apparatus.

21. The virtual reality system of claim 20, wherein a sensor coil is duplicated to denote the orientation of the wearable sensor apparatus.

22. The virtual reality system of claim 20, wherein a sensor coil is absent to denote the orientation of the wearable sensor apparatus.

* * * * *